US006226093B1

United States Patent
Lo et al.

(10) Patent No.: US 6,226,093 B1
(45) Date of Patent: *May 1, 2001

(54) 3D PHOTOGRAPHIC PRINTER USING A VIDEO MONITOR FOR EXPOSURE

(76) Inventors: Allen K. Wah Lo, 5022 Hidden Branches Dr., Dunwoody, GA (US) 30338; Kenneth Quochuy Lao, 650 Glen Ave., Westfield, NJ (US) 07090

( * ) Notice: Subject to any disclaimer, the term of this patent is extended or adjusted under 35 U.S.C. 154(b) by 0 days.

This patent is subject to a terminal disclaimer.

(21) Appl. No.: 08/602,663

(22) Filed: Feb. 16, 1996

Related U.S. Application Data

(63) Continuation-in-part of application No. 08/418,016, filed on Apr. 6, 1995, now Pat. No. 5,583,971, which is a continuation-in-part of application No. 08/333,201, filed on Nov. 2, 1994, now Pat. No. 5,572,633, which is a continuation-in-part of application No. 08/011,025, filed on Jan. 6, 1993, now abandoned.

(51) Int. Cl.$^7$ .................................................. G06K 15/00
(52) U.S. Cl. ........................................ 358/1.01; 358/1.18
(58) Field of Search ..................................... 395/117, 112, 395/101, 102, 109; 345/419; 353/7–8, 6; 359/22–23; 250/558; 342/180; 396/324, 330; 348/42, 51; 346/134, 139 C; 352/57, 60–62, 239; 355/22

(56) References Cited

U.S. PATENT DOCUMENTS

| | | | |
|---|---|---|---|
| 2,472,259 | 6/1949 | McPherson | 88/16.6 |
| 2,912,488 | 11/1959 | Smith et al. | 178/5.4 |
| 3,109,057 | 10/1963 | Slavecki et al. | 178/6.5 |
| 3,688,045 | 8/1972 | Ohkoshi . | |
| 3,895,867 | 7/1975 | Lo et al. . | |
| 3,953,869 | 4/1976 | Lo et al. . | |
| 4,101,210 | 7/1978 | Lo et al. . | |
| 4,120,562 | 10/1978 | Lo et al. . | |
| 4,132,468 | 1/1979 | Lo et al. . | |
| 4,468,115 | 8/1984 | Lao | 27/32 |
| 4,506,296 | 3/1985 | Marraud et al. | 9/54 |
| 4,807,024 | 2/1989 | McLaurin et al. . | |
| 4,893,898 | 1/1990 | Beard . | |
| 4,903,069 | 2/1990 | Lam . | |
| 5,028,950 | 7/1991 | Fritsch . | |
| 5,036,356 | 7/1991 | Lo . | |
| 5,127,037 | 6/1992 | Bynum . | |
| 5,255,054 | 10/1993 | Tsai . | |
| 5,412,449 | 5/1995 | Lam . | |
| 5,572,633 | * 11/1996 | Lo et al. | 345/117 |
| 5,583,871 | * 12/1996 | Lo | 395/117 |

* cited by examiner

*Primary Examiner*—Arthur G. Evans
(74) *Attorney, Agent, or Firm*—Harold L. Marquis; Ryan A. Schneider; Troutman Sanders LLP

(57) ABSTRACT

A filmless photographic printer for making 3D and/or animation pictures on lenticular print material. A video monitor is used to sequentially display the 2D images which are projected onto lenticular print material by a projection lens at different projection angles. The projection lens and print material are moved to different positions relative to the video monitor screen. The projection lens is maintained in proper focus on the monitor screen and print material during printing. The 2D images for composing the 3D photographs can be captured by an electronic camera or generated by computer.

28 Claims, 13 Drawing Sheets

3D PHOTOGRAPHIC PRINTER USING A VIDEO MONITOR FOR EXPOSURE

This application is a continuation-in-part of an earlier filed application Serial No. 08/418,016, filed Apr. 6, 1995, now U.S. Pat. No. 5,583,971, which is a continuation-in-part of application Serial No. 08/333,201, filed Nov. 2, 1994, now U.S. Pat. No. 5,572,633, which in turn, is a continuation-in-part of a now abandoned application Serial No. 08/011,025, filed Jan. 6, 1993, now abandoned.

FIELD OF THE INVENTION

The present invention relates generally to a photographic printer, and more specifically a printer for making 3D pictures or animation pictures on lenticular print material.

BACKGROUND OF THE INVENTION

In making a lenticular-type 3D picture or animation picture, the basic process involves exposing a plurality of 2D images, each at a different projection angle, onto a lenticular print material to form a plurality of optically-compressed line-form images on the photosensitive coating underlying the lenticules of the lenticular print material. It is well-known that, in making a 3D picture of a scene, it is necessary to select a common point in each 2D image of the scene as the registration point (also known as the key subject in 3D photography) for aligning these 2D images during exposure. U.S. Pat. No. 5,412,449 (Lam) discloses a single-stage printer for making 3D pictures from 2D images recorded on film; U.S. Pat. No. 5,028,950 (Fritsch) discloses a dual-stage printer for making 3D pictures from 2D images recorded on film. In both disclosures by Lam and by Fritsch, the key subject in each 2D image must be first captured by an electronic camera and the key subject location determined by a computer. After the key subject location is known, the alignment of the key subject is accomplished by separately adjusting each of the negatives on which the 2D images are recorded.

Presently, in order to produce a 3D picture, it is necessary to take a series of 2D images and record them on film. The printing of 3D pictures can only be carried out after the film is processed. This requirement renders real-time 3D photography not plausible. Furthermore, determining the key subject location and the alignment of the key subject during printing requires precision optical means and mechanical means. Each of the above-mentioned disclosed methods requires a printer of high degree of complexity. Furthermore, the images recorded on film are difficult to change or combine or edit at the time of printing.

It is desirable to provide a lenticular printer which operates on a simple principle and allows the images to be manipulated before or at the time of printing.

SUMMARY OF THE INVENTION

The present invention provides a filmless photographic printer for making 3D and/or animation pictures on lenticular material composed from at least two 2D images. The printer uses a video monitor to sequentially display the 2D images, and a projection lens to project the displayed 2D images onto a lenticular print material at different projection angles. In order to change the projection angles, the projection lens and print material are moved to different positions relative to the video monitor screen. At all times, the print material is maintained substantially parallel to monitor screen and the projection lens is maintained to properly focus on the monitor screen and the print material. It is understood that the moving direction of the projection lens and the print material is perpendicular to the longitudinal axes of the lenticules. The 2D images for composing the 3D photographs can be of real objects or generated by a computer. The 2D images generated by a computer or captured by an electronic camera (digital or analog) can be directly conveyed to the video monitor for displaying and exposing. They can also be stored in a computer workstation which is also used for controlling the printer operations and processing the 2D images if desired or necessary. The 2D images can also be retrieved into the computer workstation from other devices such as a tape drive, image scanner, CD-ROM drive and other optical, electronic and magnetic devices. The 2D images can also be transferred electronically through a network such as Ethernet or Internet. The printing can be done in real-time.

In the filmless printer according to the present invention, key subject alignment is achieved electronically. The key subject in the 2D images stored in the computer workstation can be located by electronically comparing the pattern around the key subject image to find out whether the key subject in each 2D image is located at the same pixel location. Based on the result of this pattern comparison, 2D images can be electronically shifted to achieve key subject alignment. Thus, the filmless printer according the present invention does not require a highly complex optical and mechanical means for locating the key subject and the alignment of the key subject. As for computer-generated graphics, key subject alignment can be easily eliminated by keeping the key subject at the same pixel location when rendering and generating the graphics. Even in 3D pictures of a real object, key subject alignment can also be eliminated by aiming the electronic camera at a common point in the scene while acquiring the 2D images.

It should be noted that, using 2D images acquired by an electronic camera or generated by a computer, the difference in the viewing angle between two sequentially displayed 2D images can be made very small. Thus, a 3D picture produced by this filmless printing method can be composed of a very large number of 2D images and can still have a proper parallax. Consequently, the image on a 3D picture made by this filmless method will look continuous and not jumpy as the image appears on 3D photograph made from a small number of 2D images taken by a multi-lens camera and recorded on film.

It is the objective of the present invention to provide a method of making 3D and animation pictures using a video monitor screen for exposing a plurality of 2D images sequentially displayed thereon through a projection lens onto a lenticular print material.

It is another objective of the present invention to provide a method of making 3D and animation pictures on lenticular print material in real-time.

It is yet another objective of the present invention to provide a method of making 3D and animation pictures on lenticular print material wherein the scenes in the pictures can be edited, combined or altered electronically prior to or at the time of printing.

It is a further objective of the present invention to provide a method of making 3D pictures on lenticular print material wherein the key subject alignment can be achieved by only using electronic means.

It is another objective of the present invention to provide a photographic printer for making lenticular pictures (3D or animation) comprising a video monitor for sequentially displaying 2D images for exposure, and means for moving the projection lens and the print material for changing the projection angle and filling the photosensitive layer underlying the lenticules with optically compressed line-form images.

It is yet another objective of the present invention to provide a filmless 3D photographic printer for making lenticular pictures wherein the locating and aligning of the key subject in each 2D image can be achieved electronically in a computer workstation thereby eliminating the need of a highly complex optical and mechanical means as those used in a conventional 3D printer which makes 3D pictures from 2D images recorded on film.

It is a further objective of the present invention to provide a photographic printer for making lenticular pictures wherein 2D images can be electronically transferred to the printer and the printing can be carried out in real-time if desired.

DETAILED DESCRIPTION OF THE INVENTION

Figure 1:
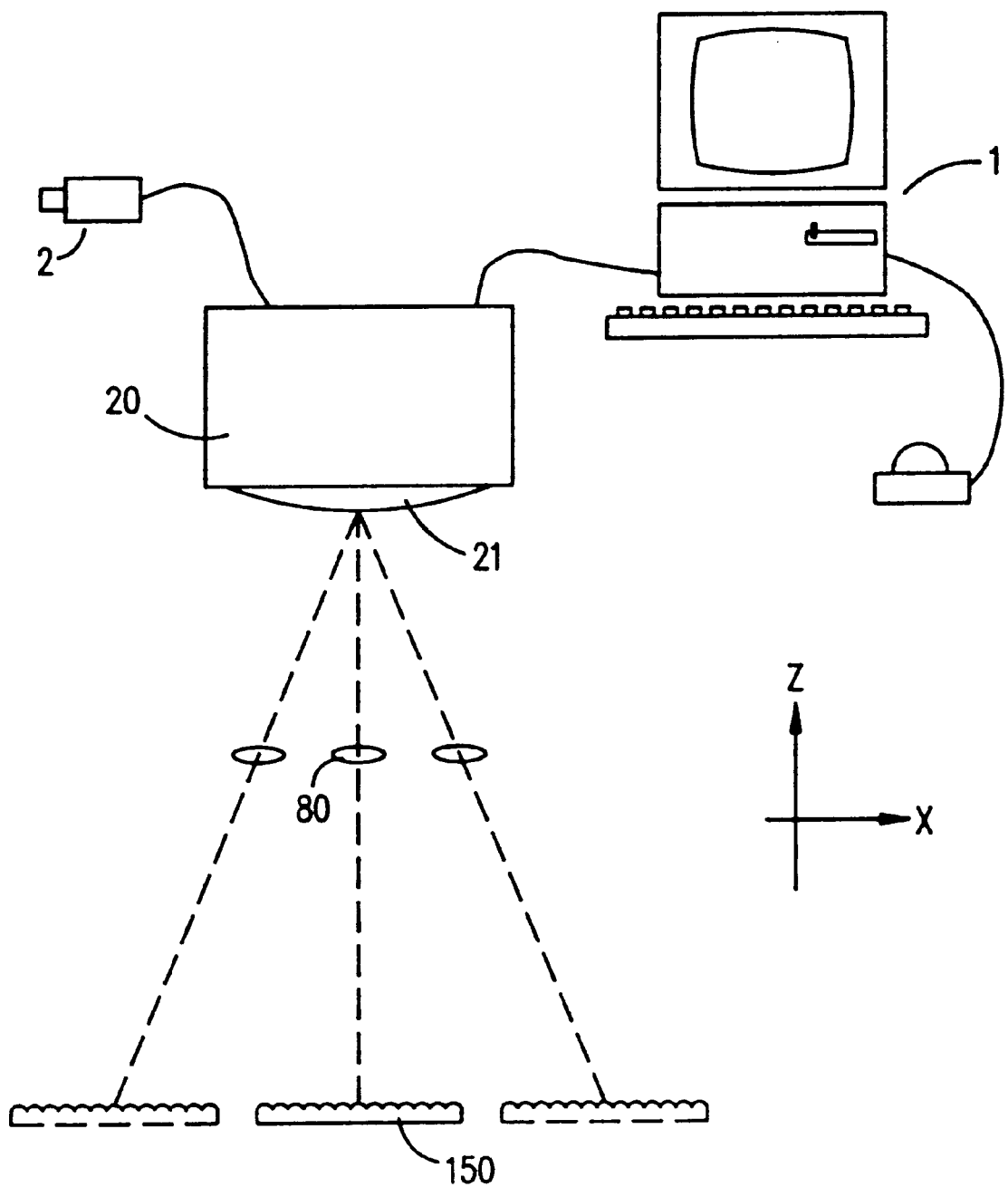
FIG. 1 is a schematic view showing the basic features of the lenticular printer.

FIG. 1 shows the basic principle of the filmless printing method for making 3D and/or animation pictures from a plurality of 2D images on lenticular print material, according to the present invention. As shown in FIG. 1, numeral 20 denotes a video monitor 20 having a screen 21 for sequentially displaying the 2D images. It is understood that a magnetic shield may be required to shield the monitor against electromagnetic interference. Numeral 80 denotes a projection lens for projecting the displayed 2D images onto lenticular print material 150. Numeral 1 denotes a computer workstation the functions of which may include storing and/or receiving 2D images; conveying 2D images to the video monitor 20 for exposure; controlling the means for moving the print material 150 and projection lens 80 to different positions to change the projection angles; generating computer graphics; and electronically processing 2D images. The lenticular print material 150 comprises a contiguous array of cylindrical lenses, or lenticules, having parallel longitudinal axes which are parallel to the Y axis (not shown) and perpendicular to X and Z axes as depicted in the figure. Numeral 80 denotes a projection lens for sequentially projecting 2D images displayed on the monitor screen 21 onto the lenticular print material 150. It is understood that the projection lens 80 is placed in a position such that an image displayed on the monitor 20 is properly focused on the print material 150 with a desired magnification. The lenticular print material 150 is maintained substantially parallel to the monitor screen 21 as it is moved to different positions. It is also understood that, in making a 3D picture, the 2D images may be electronically shifted in the computer so that the key subject in each 2D image is properly aligned with each other before being conveyed to the video monitor 20 for exposure. The color, density and orientation of each 2D image may be changed to suit the photographic characteristics of the print material. Moreover, the projected images may require color filtration to achieve the desired color on the 3D or animation picture. An electronic camera 2 may be used to acquire 2D images and convey the images to the monitor 20 directly as shown, or indirectly through the computer workstation 1.

Figure 2A:
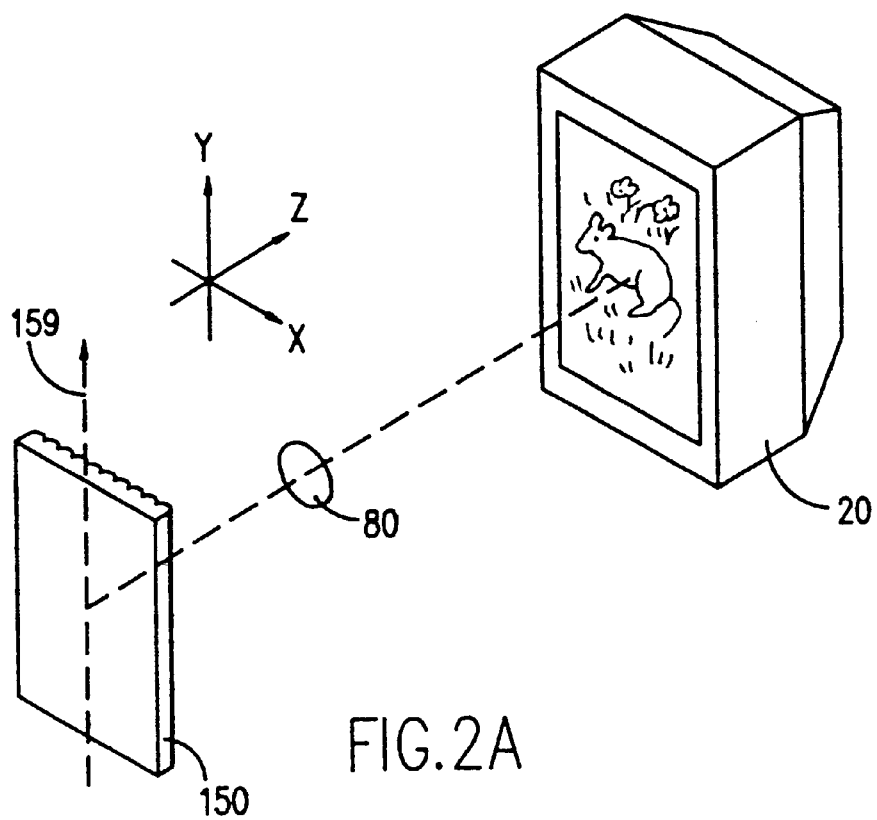
FIG. 2 shows the orientation of an image displayed on the monitor in relation to the longitudinal axes of the lenticules.
Figure 2B:
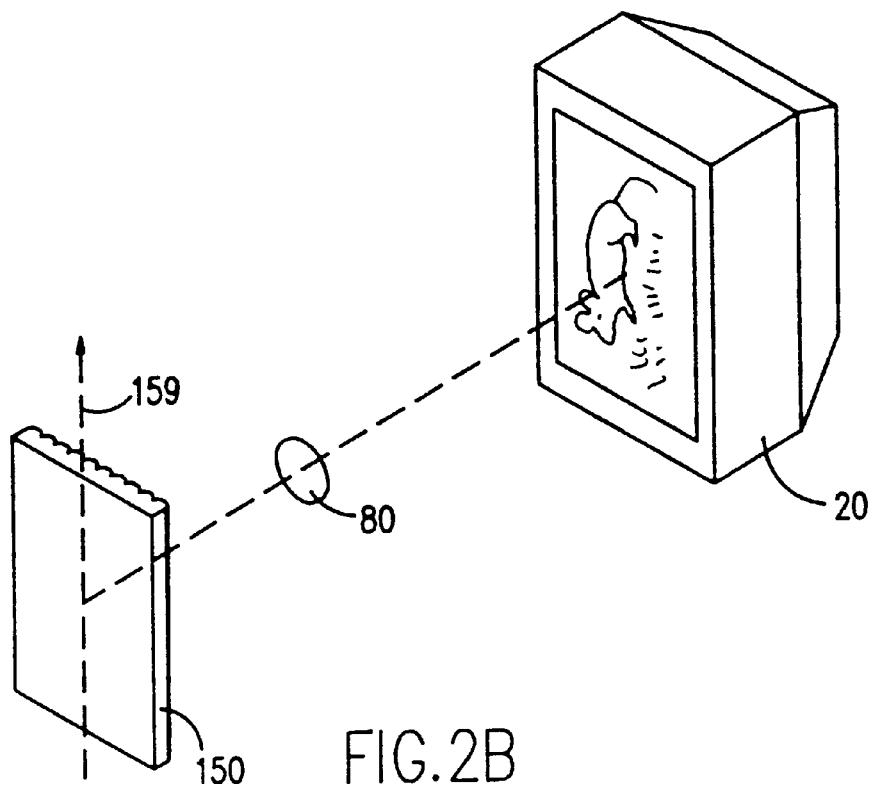

FIG. 2 shows the orientation of an image displayed on the monitor 20 in elation to the longitudinal axes 159 of the lenticules on the lenticular print material 150. In FIG. 2A, the upright direction of an image displayed on the monitor 20 is parallel to the longitudinal axes of the lenticules which is suitable for making 3D pictures and animation pictures. In FIG. 2B, the upright direction of an image displayed on the monitor 20 is perpendicular to the longitudinal axes of the lenticules, which is suitable for making animation pictures.

For making a 3D picture, the displayed images are a series of 2D images of the same scene as viewed at different angles, to yield proper parallax on the picture. For making an animation picture, parallax may not be required and, therefore, the 2D images can be of different scenes, or of the same scene with arbitrary changes.

Figure 3:
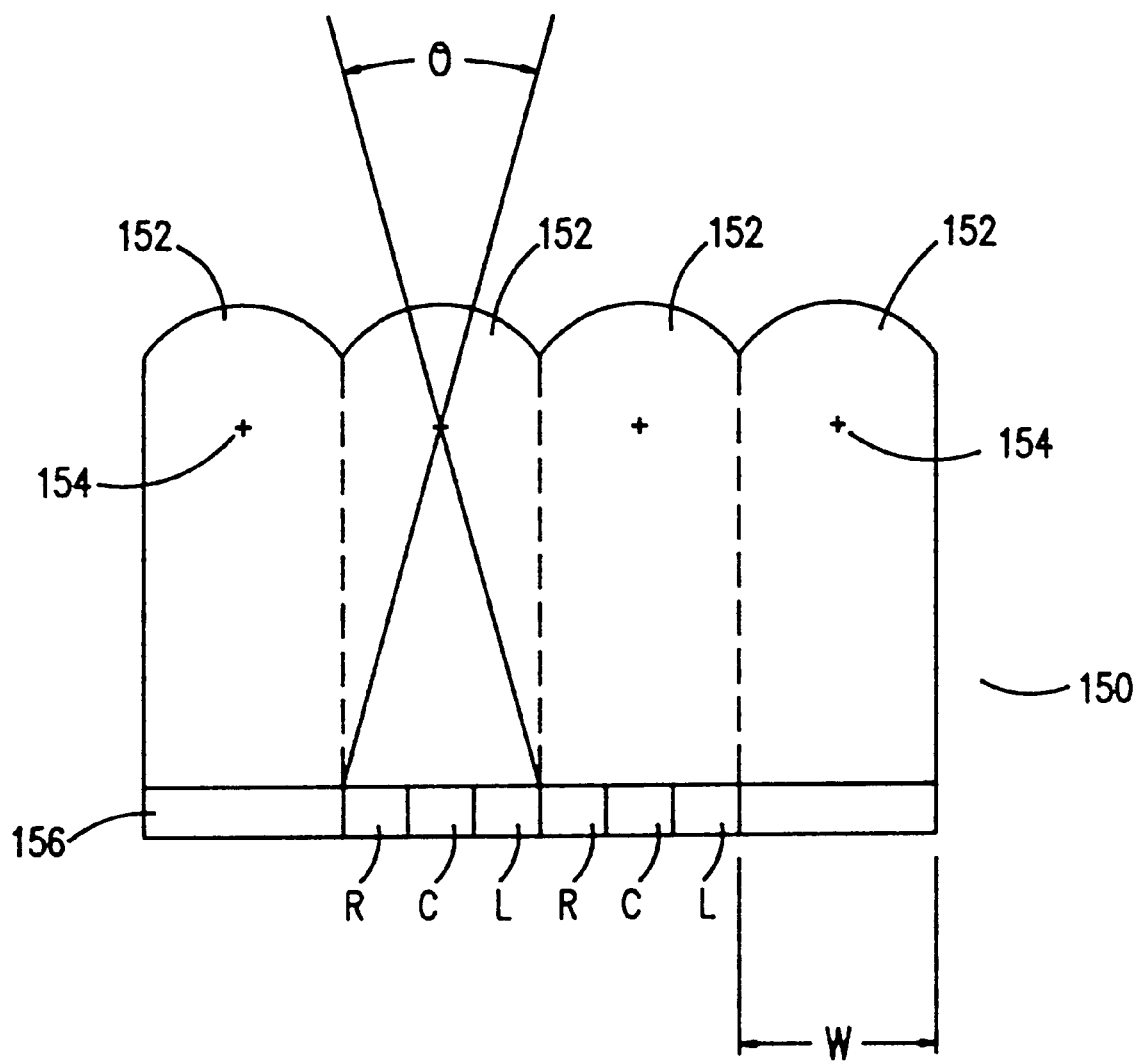
FIG. 3 illustrates the line-form images formed under the lenticules.

FIG. 3 illustrates the optically compressed line-form images formed on the print material under each lenticule when a number of 2D images are properly exposed. In FIG. 3, numeral 152 denotes the lenticules on lenticular print material 150. Each lenticule is a cylindrical lens having a radius of curvature the center of which is marked by a cross denoted by numeral 154. Numeral 156 denotes the photosensitive coating on which the line-form images are formed. For illustration purposes only, the 3D picture or animation picture shown in FIG. 3 is composed of three 2D images. Thus, under each lenticule 152 there are three optically compressed line-form images denoted by R, C and L. It is preferred that the aperture of the projection lens 80 is properly adjusted so that the line-form images under each lenticule substantially fill the entire width, w, of each lenticule 152. The total viewing angle of the lenticules is denoted by Θ.

Figure 4A:
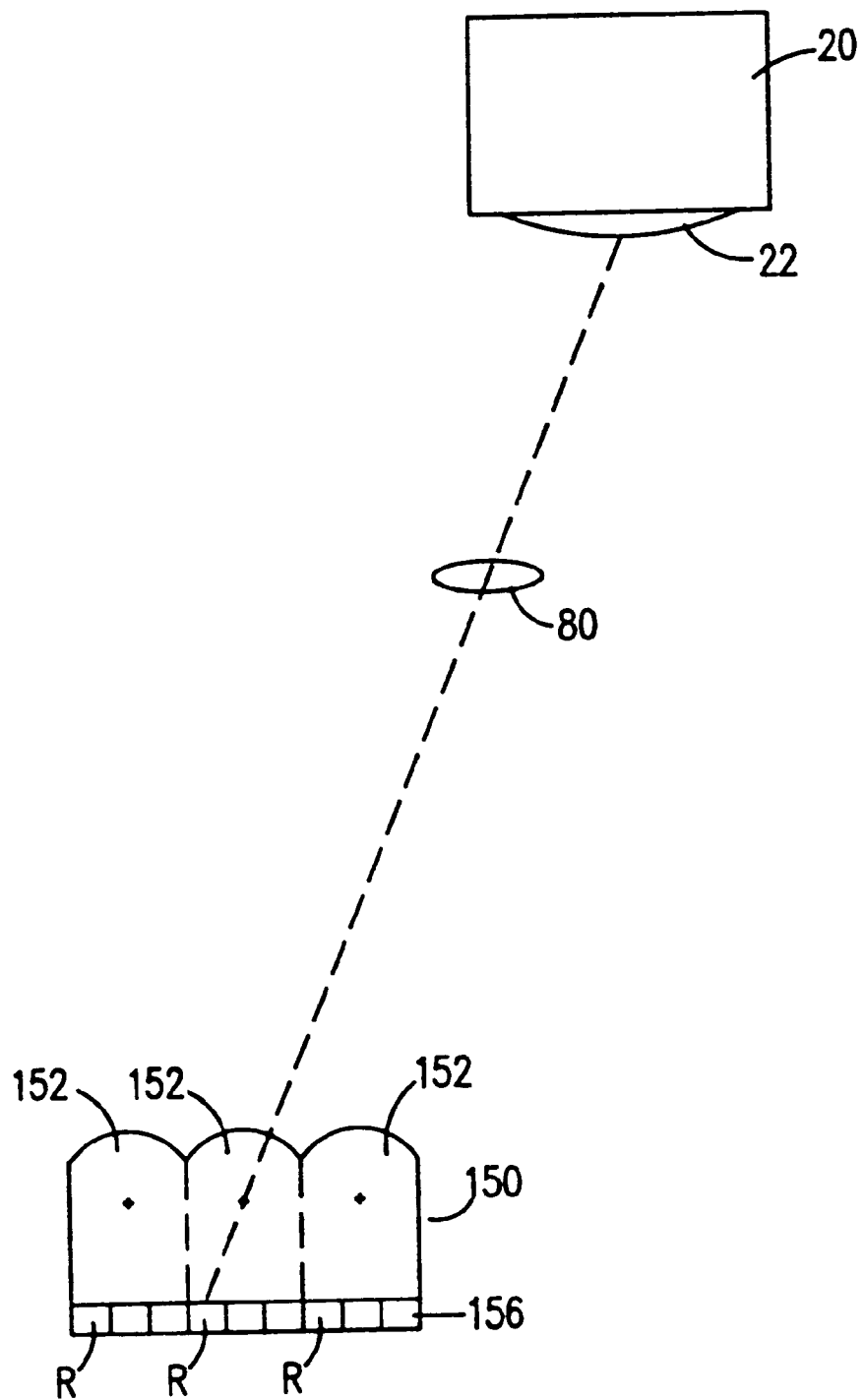
FIG. 4 shows the different positions of the projection lens in relation to the print material.
Figure 4B:
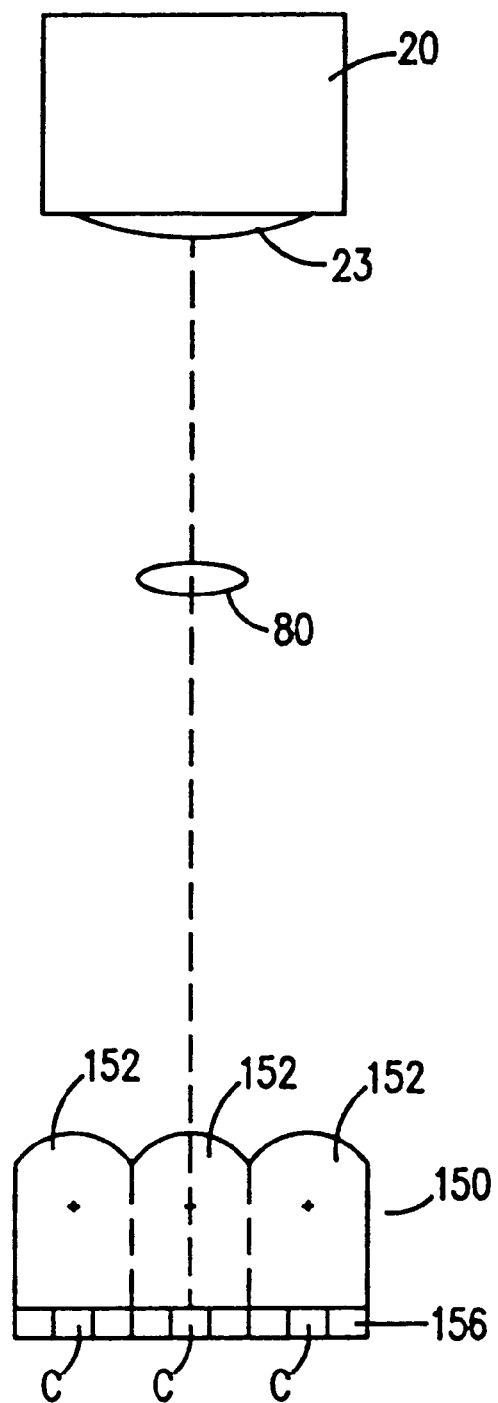
Figure 4C:
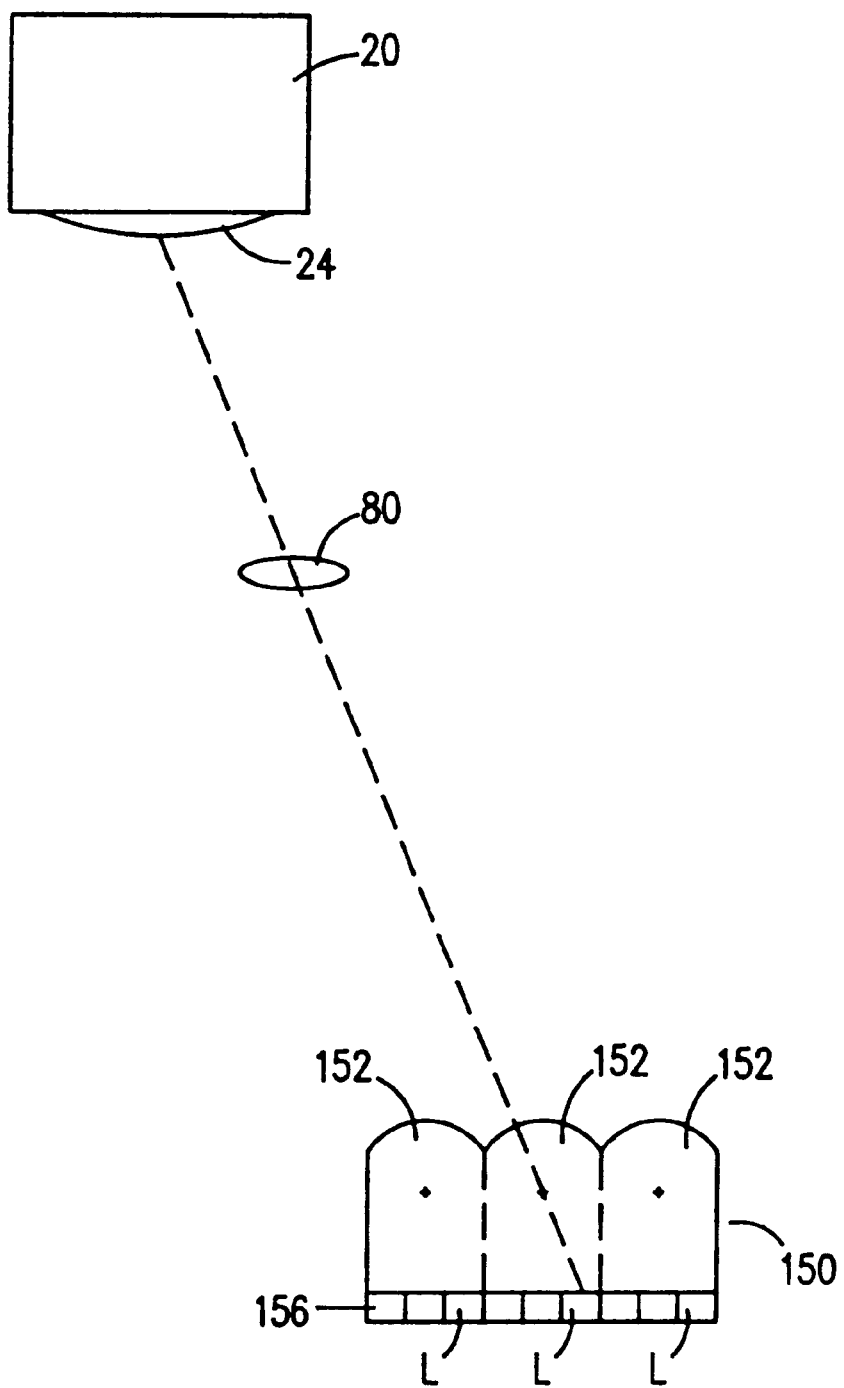

FIG. 4 shows the different positions of the projection lens and the print material during the exposure process for making a 3D or animation picture. For illustration purposes only, the picture is composed of three 2D images 22, 23 and 24, sequentially displayed on the screen 21 of the monitor 20. FIG. 4 shows the print material 150 and the projection lens 80 being in their respective first positions so that 2D image 22 is optically compressed to form line-form image R on the photosensitive coating 156 under each lenticule 152. FIG. 4B shows the print material 150 and the projection lens 80 being in their respective second positions so that 2D image 23 is optically compressed to form line-form image C on the photosensitive coating 156 under each lenticule 152. FIG. 4C shows the print material 150 and the projection lens 80 being in their respective third positions so that the 2D image 24 is exposed to form line-form line-form image L under each lenticule.

Figure 5:
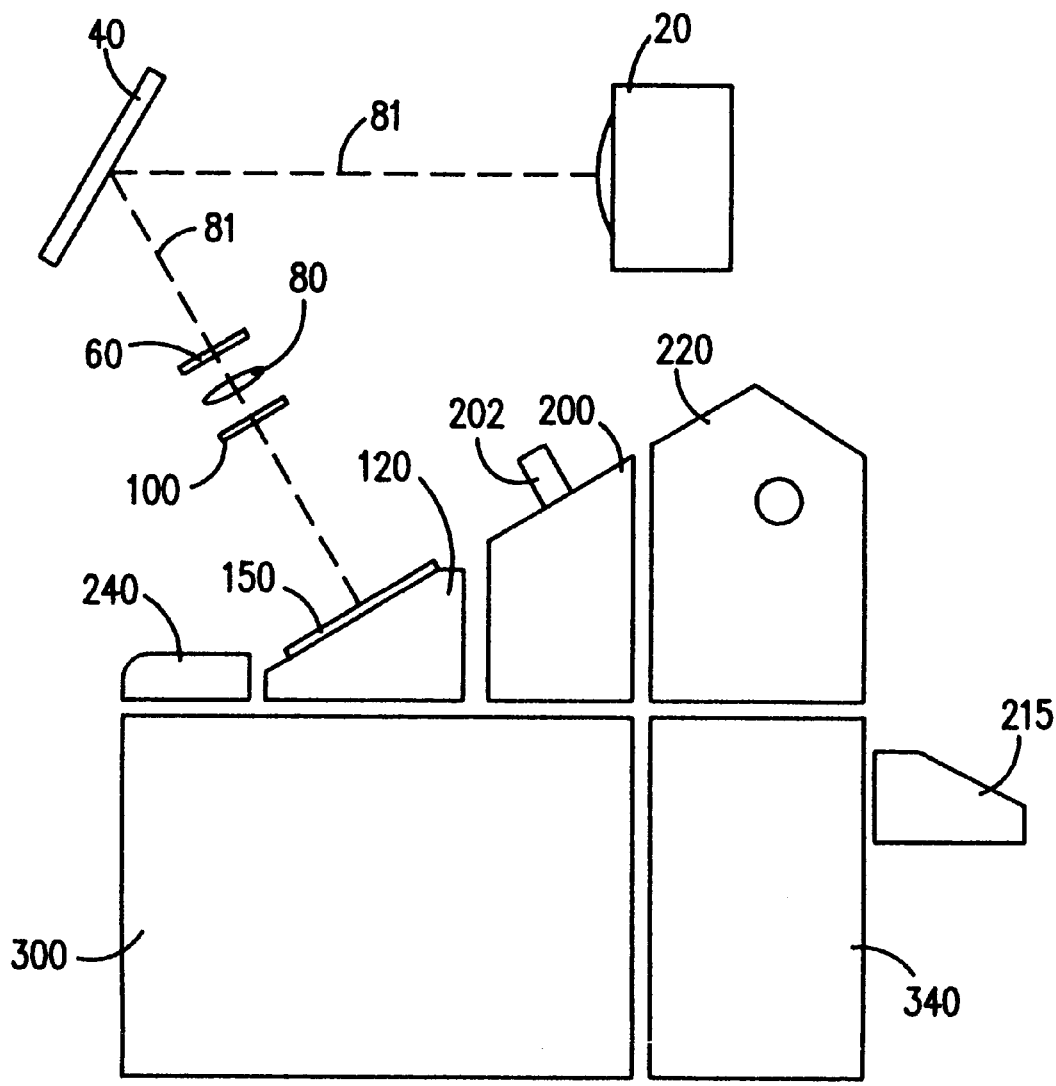
FIG. 5 shows the preferred embodiment of the present invention.

FIG. 5 illustrates the preferred embodiment of the filmless printing method according to the present invention. In FIG. 5, a mirror 40 (preferably a front-coated, plane mirror) is used to fold the optical path 81 of the 2D images 22, 23 or 24 prior to entering the projection lens 80. Numeral 60 denotes a shutter which is used to shield the print material from unwanted exposure to light. Numeral 100 denotes a color filter or a group of filters for correcting the color and density of the picture. Preferably, the exposure time for exposing the 2D images onto the lenticular print material 150 is controlled by the displayed duration of each image 22, 23, or 24 on the monitor 20. Numeral 120 denotes an easel which is used to hold the print material 150 in place during exposure and to transport the print material to different positions to change the projection angles. When the print material 150 is moved to a different position, the projection lens 80 is also proportionally moved to a different position along with the color filter 100 and the shutter 60. Numeral 220 denotes a paper cassette for storing a roll of the print material. Retrieving means 200 with a cutter 202 are used for retrieving a desired length of print material from the paper cassette 220 for printing. Numeral 240 denotes a dispenser means for dispensing the print material 150 into a chemical processor 300 after the print material is properly exposed. The processed print material is dried by a dryer 340 before it is carried out to a chute 215.

Monitor 20 can be a color monitor or a black-and-white (B/W) monitor. Preferably, each of the 2D images is electronically separated into three color components of red, green and blue so that each 2D image is displayed three times on the monitor each time with a different color component, and separately exposed on the print material 150 with a different exposure time.

The density of each of the 2D image may be required to be reversed so that the 2D image becomes a negative image for exposure. It is understood that the 2D images are not required to be reversed to become mirror images for exposure when mirror 40 is used to fold the optical path 81.

Furthermore, paper cassette 220 may be used to store regular photographic paper for making regular 2D pictures. However, when printing a 2D picture on regular photographic paper, the photographic paper does not need to be moved to different positions.

Figure 6:
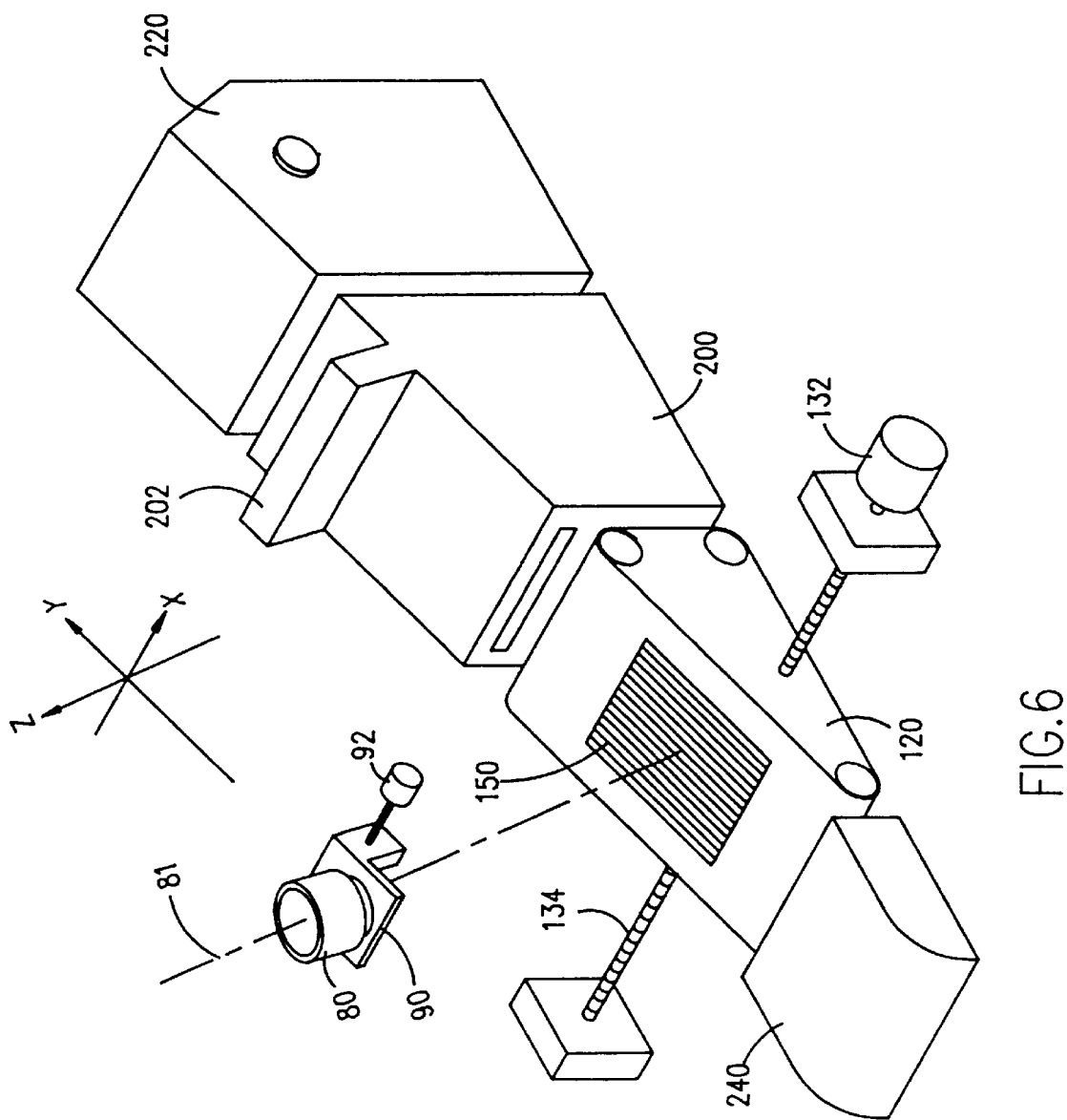
FIG. 6 illustrates the details of some of components in the printer.

FIG. 6 illustrates the print material cassette 220, retrieving means 200 with a cutter 202, an easel 120 and a projection lens 80. As shown in FIG. 6, the optical axes 81 of projection lens 80 is parallel to the Z axis; the longitudinal axes of the lenticules on the print material 150 is parallel to the Y axis; while the moving direction of the easel 120 and the projection lens 80 is parallel to the X axis. The easel is driven by motor 132 and moves along a lead screw 134. The projection lens 80 is mounted on a lens base 90 which is driven by a motor 92 to different positions along the X axis.

Figure 7:
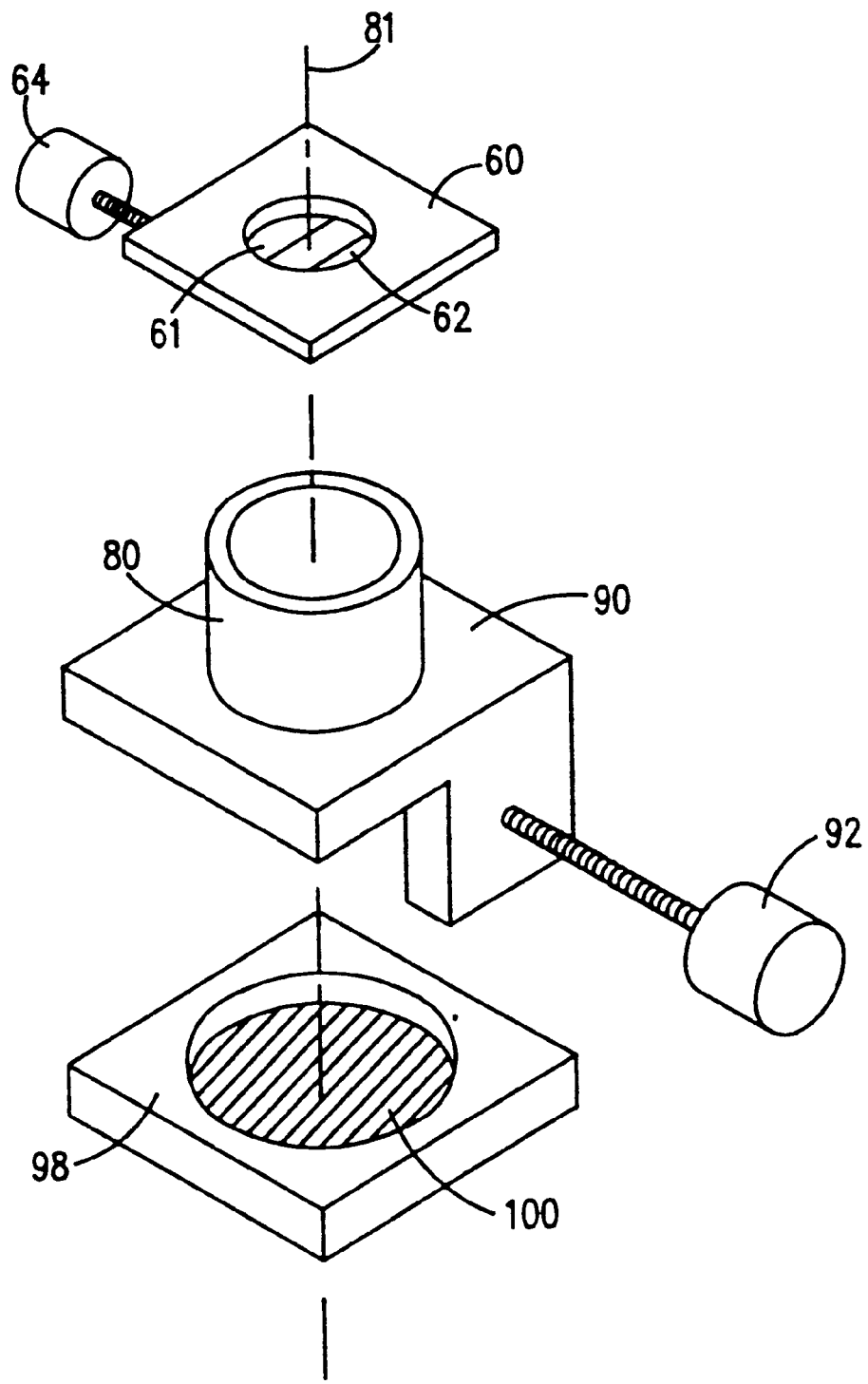
FIG. 7 illustrates the shutter, the lens and the filter assembly of the printer.

FIG. 7 illustrates the shutter 60, the projection lens 80 and the color filter 100. As shown in FIG. 7, the shutter 60 has shutter blades 61 and 62 which are driven by a motor 64 or a solenoid for opening and closing. Filter 100 can be a single color filter or a group of color filters mounted on a filter tray 98. Filter tray 98 and shutter 60 are physically connected to the lens base 90 so that they are moved together with the projection lens 80 to different positions during printing.

Figure 8:
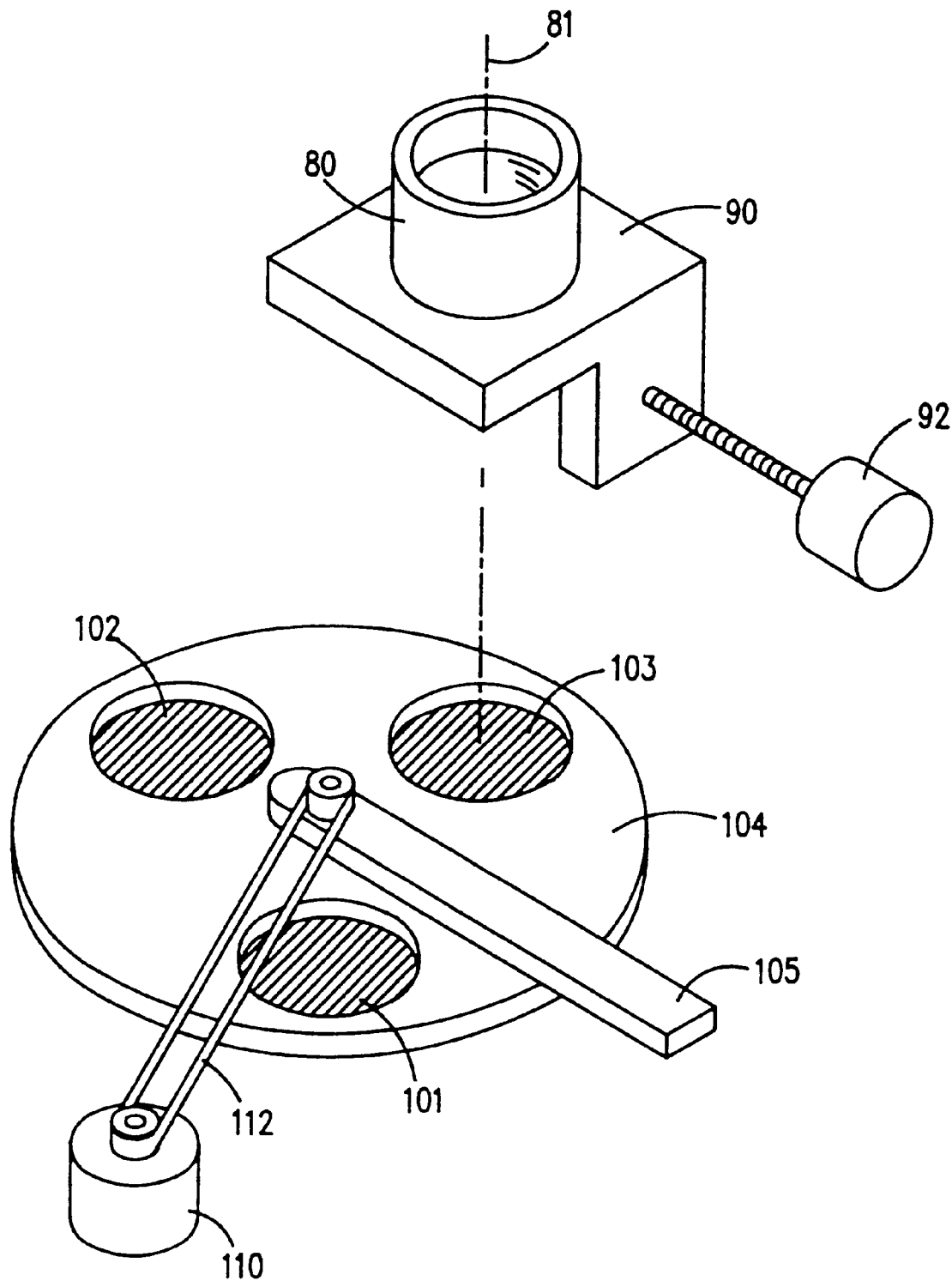
FIG. 8 illustrates a filter wheel being used in lieu of a single filter.

FIG. 8 is a schematic illustration of a filter wheel 104 which is used in lieu of a single filter 60. As shown, the filter wheel 104 contains at least three color filters of red, green and blue separately denoted by numerals 101, 102 and 103. The filter wheel 104 is movably mounted on a base plate 105 which is physically connected to the lens base 90 so that the filter wheel is moved along with the projection lens 80 during printing. The filter wheel is driven by a motor 110 with belt 112 so that any one filter can be selected for printing. It is understood that when a color component of a 2D image is displayed on the monitor screen for exposure, a corresponding color filter on the filter wheel 104 is selected for color filtration. For example, when the green component of a 2D image is displayed, the green color filter on the filter wheel will be used.

Figure 9:
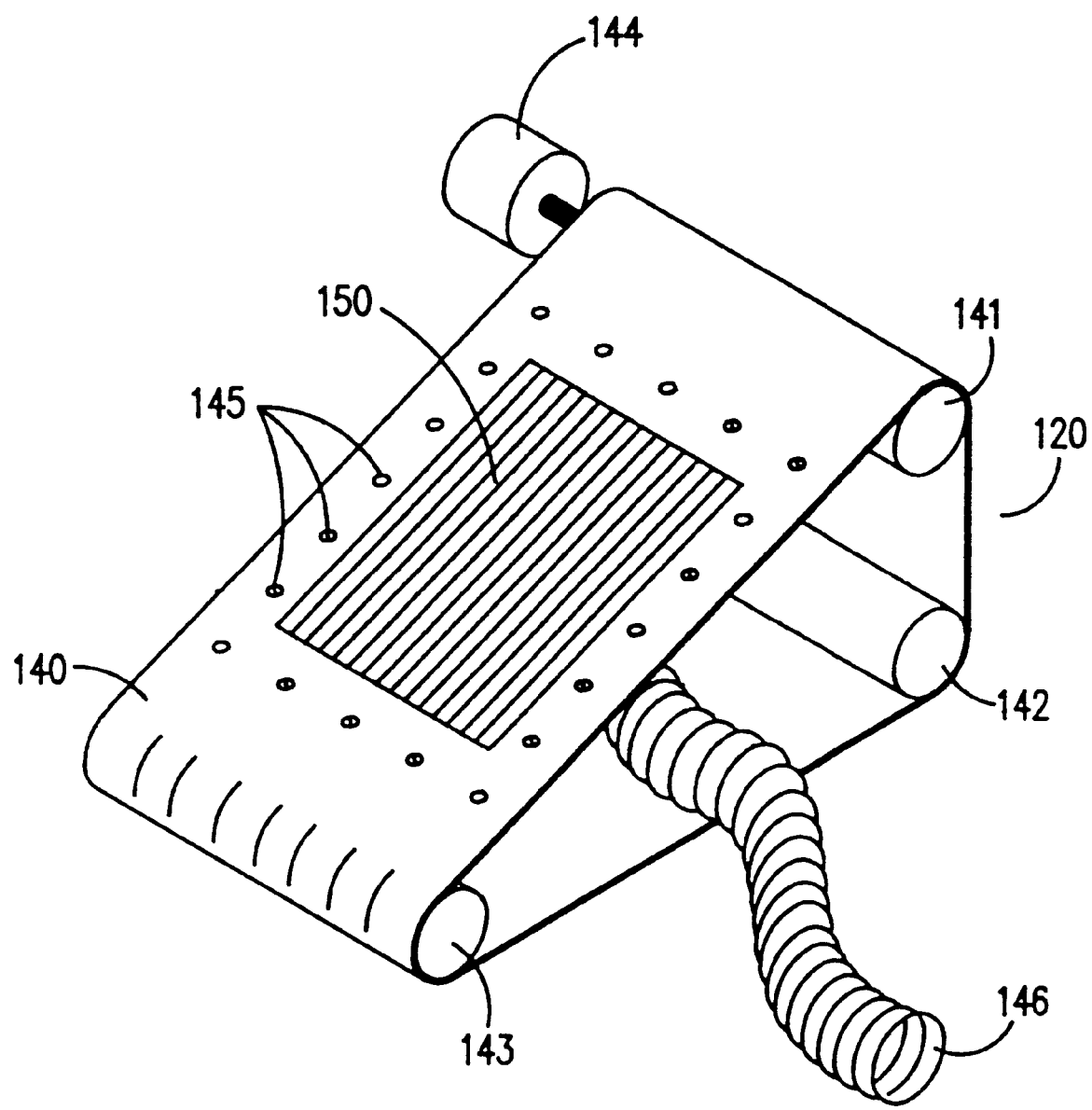
FIG. 9 illustrates the easel or the print material holder.

FIG. 9 illustrates the easel for holding the print material in place during exposure and for moving the print material to different positions to change the projection angles. As shown, the easel 120 comprises a conveyor belt 140 for receiving the print material 150 from retrieving means 200 and holding it at a proper position during exposure. The print material 150 is held by vacuum suction through an array of suction holes 145 on the conveyor belt 140. Vacuum suction is achieved by drawing air through a suction hose 146. The conveyor belt is driven by a motor 144 and at least three rollers 141, 142 and 143.

Figure 10:
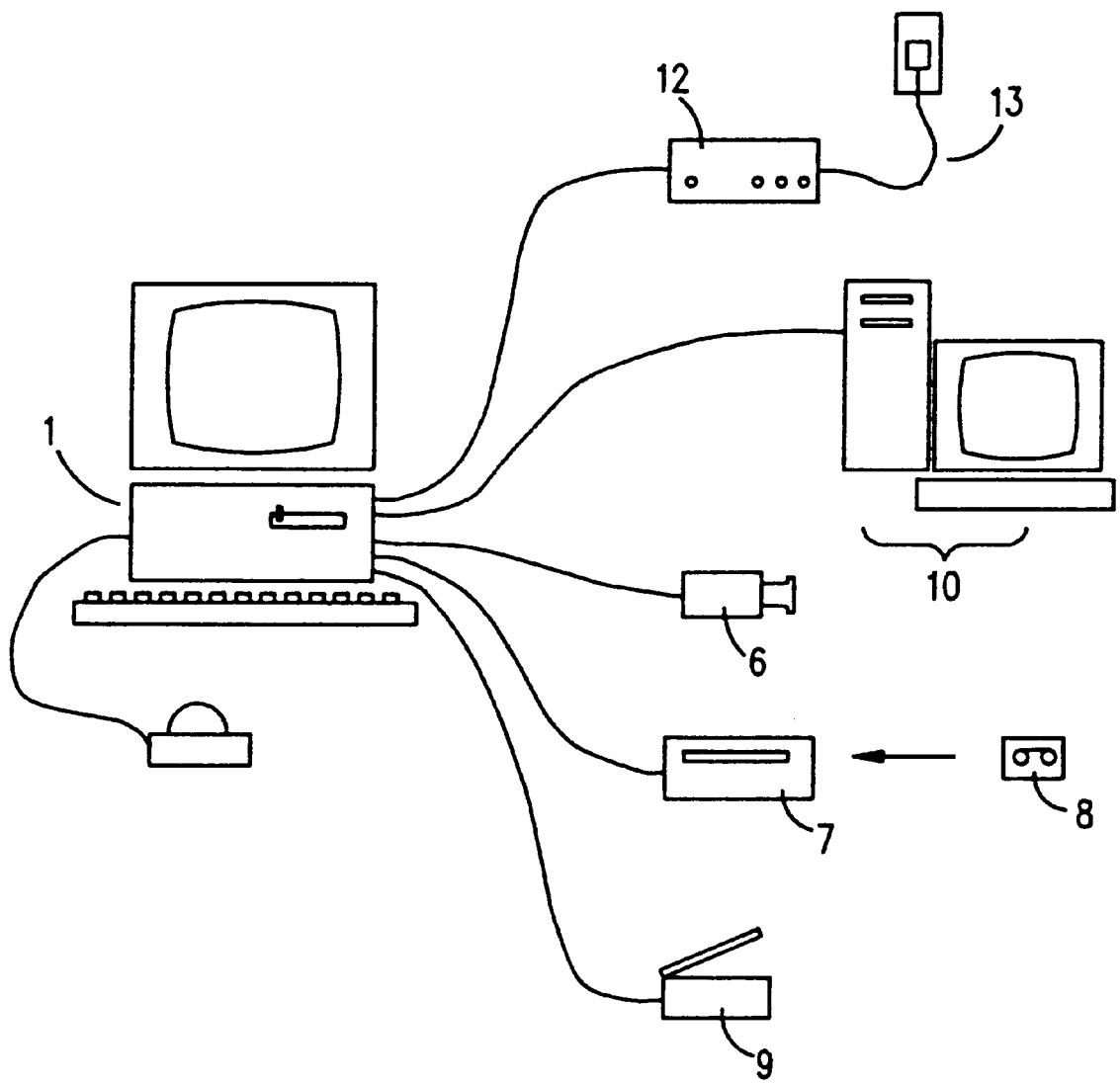
FIG. 10 illustrates the different image sources for transferring 2D images to the computer.

FIG. 10 illustrates different image devices for generating, acquiring and transferring 2D images. As shown, the computer workstation 1 may contain a number of internal data retrieving means such as a floppy disk drive, CD-ROM drive and communication peripherals such as a modem and Ethernet controller. The computer workstation 1 may be linked to an external modem 12 and phone line 13 for downloading images or text files from remote sources through Internet or other networks. It may be linked to another computer workstation 10; an electronic camera 6; a DAT drive 7 for downloading images from a tape 8 or a ZIP drive for downloading images from a ZIP disk; and an image scanner 9.

Figure 11:
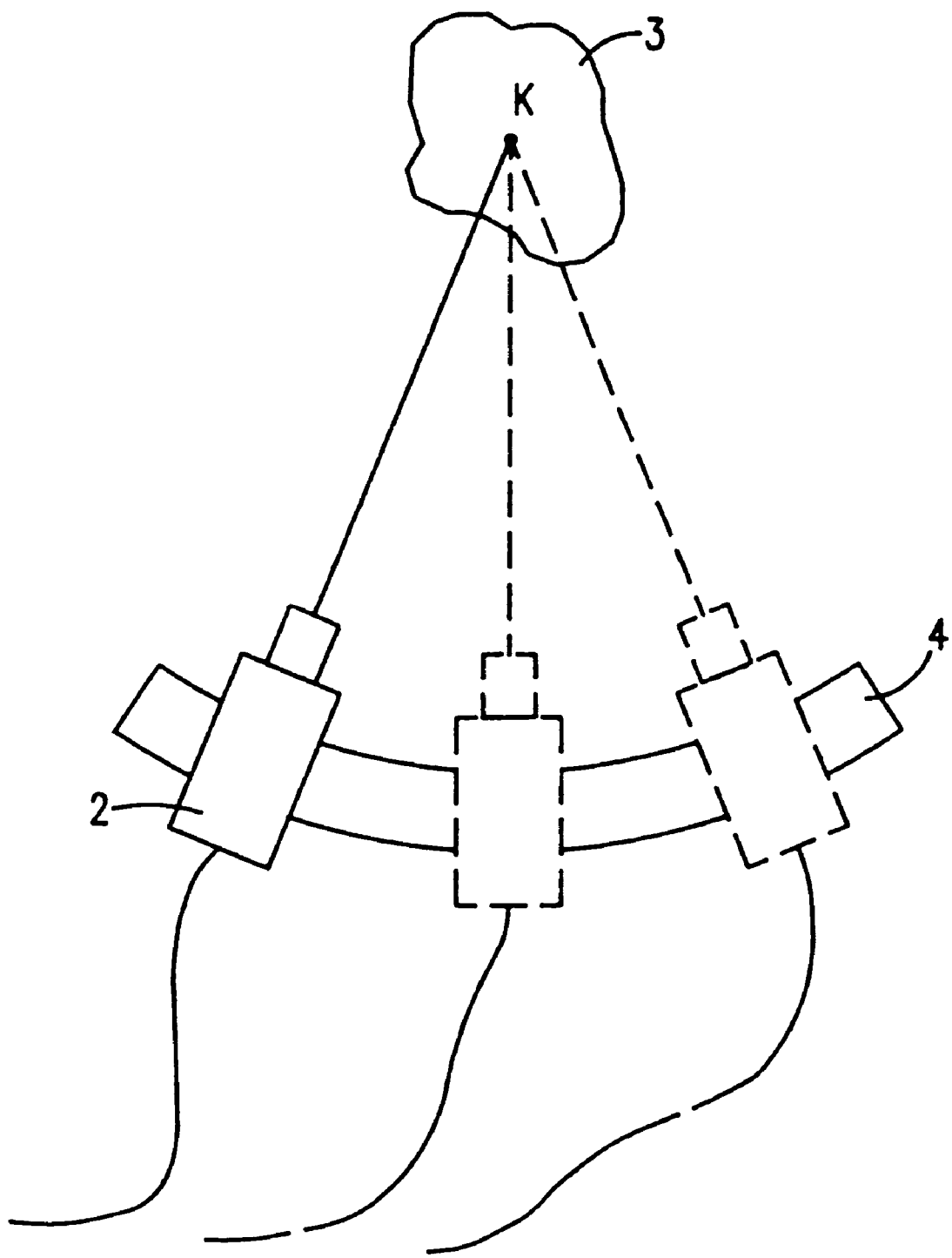
FIG. 11 shows an electronic camera on a track being used to capture a series of 2D images of a scene at different viewing angles.

FIG. 11 shows an arrangement for acquiring 2D images by an electronic camera. As shown, an electronic camera 2 is mounted on a track 4 to acquire a series of 2D images of a stationary object 3. The track is setup so that the camera 2 is properly aimed at a common point k on the object 3. Consequently, the key subject (the common point k) of each of the acquired 2D images is located at the same pixel location. Thus, the key subject alignment process in making a 3D picture is eliminated. Alternatively, the electronic camera 2 is held stationary while the object 3 is rotated about an axis at point k.

It should be noted that the camera 2 can be mounted on a linear track to acquire a series of 2D images of a stationary scene at different viewing angles. In that case, the key subject image in each 2D image may shift to different pixel location, and the 2D images must be electronically shifted prior to conveying to the monitor for exposure so that the key subject is properly aligned.

Preferred method of Operation

When 2D images are directly conveyed from one or more electronic cameras to the video monitor for composing a 3D picture, it is essential that the electronic cameras be aimed at a common point (the key subject) in the scene when acquiring 2D images of the scene at different viewing angles.

When 2D images are computer-generated on a computer and directly conveyed to the video monitor for composing a 3D picture, it is essential that the key subject in each 2D image be located at the same pixel location.

When 2D images are digitally stored and then transferred to the video monitor for printing, it is essential that 2D images are electronically shifted so that the key subject image in each 2D image is located at the same pixel location to achieve the key subject alignment.

The following description of the method of operation is only for illustrating the principle of filmless lenticular printing. It is based on the assumption that the lenticular picture is composed of three 2D images of the same scene (for making 3D pictures) or of different scenes (for making animation pictures); and that the 2D images are stored in a computer workstation with the key subject image being located at the same pixel location. Moreover, it is assumed that the video monitor is a B/W monitor and, therefore, a filter wheel containing separate red, green and blue filters is used for color filtration during exposure. Under these assumptions, the printing procedure is as follows:

1. The easel is moved to a designated center position to accept a section of print material which is supplied by the paper cassette and cut to a desired length. The print material is held at a proper position on the easel.

2. Set N=1.

3. The easel and the projection lens are moved to their respective Nth positions for exposing the Nth 2D image.

4. The Nth 2D image is separated into red, green and blue components.

5. The shutter is opened and the exposure begins:
   a. The red color filter is positioned under the projection lens, and the red component of the Nth 2D image is displayed on the monitor screen for a proper duration.
   b. The green color filter is positioned under the projection lens, and the green component of the Nth 2D image is displayed on the monitor screen for a proper duration.
   c. The blue color filter is positioned under the projection lens, and the blue component of the first 2D image is displayed on the monitor screen for a proper duration.

6. The shutter is closed and the exposure ends.

7. Set N=2, repeat steps (3) to (6).

8. Set N=3, repeat steps (3) to (6).

9. The easel moves to the center position and releases the exposed print material to the chemical processor for processing.

The video monitor 20 can also be color monitor. With a color video monitor, the printing can still be carried out according to the above procedure. Alternatively, the printing can be carried out using a single common filter for exposing all three color component images. In that case, a single common filter is used in lieu of the three color filters in Step (5). It should be noted that the exposure times for exposing the three color component in Step (5) are, preferably, different depending on the characteristics of photosensitive emulsion on the print material. However, the three exposure times can be made equal by using proper color filters and the exposure of each 2D image can be done once without separating the image into color components.

In the case that each 2D image is exposed without being separating into color components, it is possible to expose the print material in a scanning fashion in that the easel and the projection lens move continuously to change the projection angles while a sequence of 2D images are continously or discretely conveyed to the video monitor for continual display. It is possible that an electronic camera is directly connected to the video monitor to transfer the 2D images captured by the camera in real-time.

The exposure process for making a monochrome lenticular picture is similar to that for making of color lenticular picture.

It should be noted that the density of the 2D images may be required to be reversed so that the images are negative images. Because a mirror 40 is used to fold the optical path, these 2D images are not required to be reversed to become mirror images.

While the filmless printing method and apparatus according to the present invention have been described with reference to the preferred embodiment and the preferred method of operation, it shall be understood by those skilled in the art that various changes may be made and equivalents may be substituted for elements and steps thereof without departing the scope of the invention.

Therefore, it is intended that the present invention shall include embodiments and modes of operations falling within the scope of the appended claims.

What is claimed is:

1. A filmless printing method for producing 3D and animation pictures from a plurality of 2D images on lenticular print material comprising a multiplicity of lenticules having parallel longitudinal axes, said method comprising the steps of:

a) storing said 2D images in a computer workstation;
   b) electronically separating said 2D images into red, blue and green color component images;
   c) electronically conveying said color component images to a video monitor having a screen for sequentially displaying said color component images on said screen;
   d) projecting said displayed component images for exposing said component images onto lenticular print material through a projection lens which is properly focused on said screen and on said lenticular print material;
   e) moving said projection lens and said lenticular print material to different positions in relation to said screen of said video monitor for exposing the color component images of each of said 2D images on said lenticular print material at a different projection angle while maintaining said projection lens in proper focus on said screen and said lenticular print material, said moving direction being perpendicular to the longitudinal axes of the lenticules of said lenticular print material.

2. The filmless method of claim 1 wherein said 2D images are captured by a least one electronic camera before being stored in said computer workstation.

3. The filmless method of claim 1 wherein said 2D images are generated by a computer before being stored in said computer workstation.

4. The filmless method of claim 1 further comprising the step of receiving said 2D images prior to storing said 2D images in said computer workstation.

5. The filmless method of claim 1 further comprising the step of electronically locating the key subject image in each of said stored 2D images which are composed of a plurality of pixels and electronically shifting said stored 2D images so that the key subject image in each of said stored 2D images is located at the same pixel location before said 2D images are separated into color component images.

6. The filmless method of claim 1 wherein a corresponding color filter is positioned between said monitor screen and said lenticular print material for filtering each of said color components of said 2D images during exposure.

7. The filmless method of claim 1 wherein a common color filter is positioned between said monitor screen and said lenticular print material for filtering each of said color components of said 2D images during exposure.

8. The filmless method of claim 1 wherein said video monitor comprises a black-and-white monitor.

9. The filmless method of claim 1 wherein said video monitor comprises a color monitor.

10. The filmless method of claim 1 further comprising the step of electronically processing said 2D images to correct the color and density thereof prior to separating said 2D images into color component images in Step (b).

11. The filmless method of claim 1 further comprising the step of electronically editing and altering said 2D images prior to separating said 2D images into color component images in Step (b).

12. The filmless method of claim 2 wherein said electronic camera captures said 2D images of a scene in sequence, said electronic camera being moved along a track to change the viewing angle.

13. The filmless method of claim 2 wherein said electronic camera captures said 2D images of a scene in sequence, said scene being rotated in relation to said electronic camera to change the viewing angle.

14. A filmless photographic printer for producing 3D and animation pictures from a plurality of 2D images on lenticular print material comprising a multiplicity of lenticules having parallel longitudinal axes, said filmless printer comprising:
   a) a video monitor having a screen for sequentially displaying said 2D images;
   b) a projection lens for projecting said displayed 2D images each at a different projection angle onto said lenticular print material, said projection lens positioned to properly focus on said screen and said print material;
   c) means for moving said projection lens and said lenticular print material to different positions in relation to said screen of said video monitor to change the projection angle while maintaining said projection lens in proper focus on said screen and said lenticular print material, said moving being carried out in a direction perpendicular to the longitudinal axes of the lenticules of said lenticular print material.

15. The filmless printer of claim 14 further comprising a computer workstation for storing and processing said 2D images, conveying said 2D images to said video monitor for displaying and exposing, and controlling the moving means.

16. The filmless printer of claim 14 wherein said 2D images are captured by an electronic camera.

17. The filmless printer of claim 14 wherein said 2D images are generated by a computer.

18. The filmless printer of claim 14 wherein said 2D images are electronically processed in a computer.

19. The filmless printer of claim 14 further comprising a shutter for shielding said print material from unwanted exposure to light.

20. The filmless printer of claim 14 further comprising at least one color filter for filtering the projected 2D images during exposure.

21. The filmless printer of claim 14 further comprising a mirror positioned between said screen of said video monitor and said lenticular print material for folding the optical path of said 2D images.

22. The filmless printer of claim 14 further comprising:
   d) a paper cassette for supplying said lenticular print material;
   e) means for retrieving a desired length of said print material from said paper cassette;
   f) means for holding said desired length of said print material in place during exposure.

23. The filmless printer of claim 14 further comprising a chemical processor for processing said print material after exposure is completed.

24. The filmless printer of claim 14 wherein each of said 2D images comprises three separate color component images in red, green and blue, to be sequentially displayed on the screen of said video monitor for exposure.

25. The filmless printer of claim 14 further comprising three separate color filters in red, green and blue, and means for positioning one of said filters to filter the projected 2D images during exposure.

26. The filmless printer of claim 14 wherein said monitor comprises a color monitor.

27. The filmless printer of claim 14 wherein said monitor comprises a black-and-white monitor.

28. The filmless printer of claim 14 further comprising means for receiving data from an electronic device selected from the group consisting of a modem, a computer workstation, an electronic camera, a tape drive, an ethernet controller, a disk drive, a CD-ROM drive, and an image scanner.

* * * * *